United States Patent
Landry et al.

[15] 3,675,155
[45] July 4, 1972

[54] SENSITIZING LUMINESCENCE OF ERBIUM WITH MOLYBDENUM

[72] Inventors: Robert J. Landry, Sturbridge; Elias Snitzer, Wellesley, both of Mass.

[73] Assignee: American Optical Corporation, Southbridge, Mass.

[22] Filed: Nov. 3, 1970

[21] Appl. No.: 86,572

[52] U.S. Cl.................................................331/94.5
[51] Int. Cl..................................................H01s 3/00
[58] Field of Search.....................331/94.5; 252/301.2

[56] References Cited

UNITED STATES PATENTS 3,590,004  6/1971  Woodcock.............................331/94.5
3,534,287  10/1970  Heller..................................331/94.5

*Primary Examiner*—Ronald L. Wibert
*Assistant Examiner*—Conrad Clark
*Attorney*—William C. Nealon, Noble S. Williams, Robert J. Bird and Bernard L. Sweeney

[57] ABSTRACT

The luminescence of an erbium or erbium-ytterbium doped glass laser rod is sensitized by surrounding the laser rod with a glass cladding containing trivalent molybdenum ions. The trivalent molybdenum ions in the cladding absorb pumping light energy in a wavelength region in which trivalent erbium ions have no strong absorption bands, and the trivalent molybdenum ions fluoresce at a wavelength within an absorption band of the trivalent erbium ions, thereby increasing the pumping light energy absorbed by the erbium laser rod.

7 Claims, 1 Drawing Figure

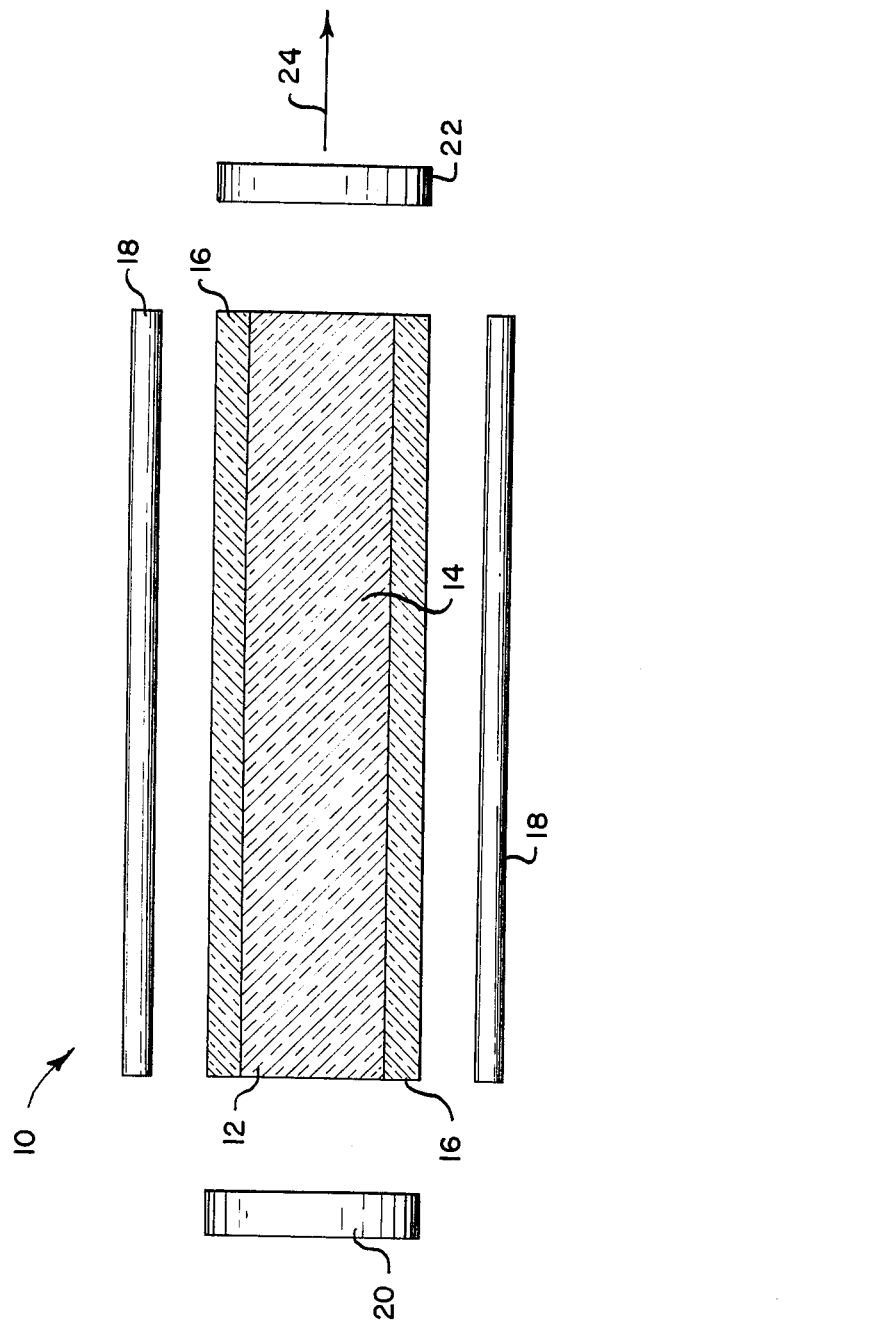

3,675,155

SENSITIZING LUMINESCENCE OF ERBIUM WITH MOLYBDENUM

BACKGROUND OF THE INVENTION

This invention is related to laser materials and is particularly concerned with a means for sensitizing laser materials such as glasses having trivalent erbium or trivalent ytterbium as the active ion therein.

A laser is a device for emitting a pulsed or continuous output beam of optical wavelength energy (herein for convenience termed laser light energy, but including energy of infrared or ultraviolet as well as visible wavelengths) which is typically (and desirably) characterized by high intensity, spatial coherence, monochromaticity, and a very narrow beam spread angle. This light energy is produced in the laser by photonic emission from the active ions of a body of laser material, such emission occurring incident to the transition of the ions from a metastable upper energy level to a lower energy level.

A typical conventional solid laser generator (sometimes termed a laser oscillator) includes an elongated unitary rod of solid laser material. The rod has a pair of reflective surfaces (one of which is partially transmissive) respectively disposed at or adjacent its opposite ends to reflect light back and forth axially through the rod. A flash tube or like light source is positioned laterally of (e.g. in surrounding relation to) the laser rod to direct pumping light energy into the rod through the side walls thereof.

Ordinarily, the population of active ions at various lower energy levels exceeds the population of active ions at the aforementioned metastable upper energy level in the laser rod. The transition of the active ions to the metastable upper energy level is effected by the selective absorption of light energy of wavelengths within the pumping light spectrum. The ions are excited into high energy levels which are quite unstable. The active ions then decay without the release of light energy to the metastable energy level. Thus, when a pulse of pumping light energy from the flash tube enters the laser rod, it abnormally increases the upper metastable level energy population of the active ions and concomitantly depletes the lower energy level population of the active ions in the rod, creating a so-called inversion of energy states.

Some of the ions thus established at the aforementioned upper metastable energy level undergo a spontaneous light-emissive transition to a lower level, and the spontaneously emitted light stimulates similar light-emissive coherent transitions of other upper metastable energy level ions. Assuming that a sufficient population inversion is achieved by the pumping light energy, the coherent light produced by the spontaneous and stimulated emissions reflects back and forth repeatedly through the rod between the reflective surfaces. This reflected light progressively stimulates further transitions of the upper metastable energy level ions and thereby develops a high intensity pulse of laser light energy which is emitted for utilization through the partially transmissive end surface.

A necessary condition for laser action is that the population inversion (or excess of upper metastable energy level ions over lower energy level ions) achieved by the pumping be sufficient so that the light produced by emission from the upper metastable energy level population exceeds the light lost by absorption of scattering or otherwise lost within the laser. The requisite population inversion, i.e., laser threshold, for laser action is, therefore, determined by the light energy entering the body of laser material, and this, in turn, is related not only to the total energy emitted by the flash tube, but also to the extent of the exposed laser material surface area on which this pumping light impinges and particularly to the proportion of the total emitted pumping energy that enters the laser material through the walls thereof.

In addition, in the case of a laser rod which utilizes erbium as the active ions therein, the number of absorption bands of the erbium ions which coincide with the spectrum of the normal pumping light energy source is small. Therefore, it is difficult to achieve a sufficient population inversion through this technique per se. It is necessary to utilize other ions as so-called sensitizing ions. These ions absorb pumping light energy in bands in which erbium is unable to absorb efficiently the pumping light energy. The sensitizing ions then transfer their energy to the erbium ions by flourescing at a wavelength corresponding to a significant erbium absorption band. Ytterbium has been the standard sensitizing ion in use with erbium as set forth by Drs. Elias Snitzer and Richard Woodcock, in *Applied Physics Letters*, Vol. 6, pp. 45–46, Feb. 1965, the teachings thereof being incorporated herein by reference. However, it is desirable to have additional means of sensitizing the active erbium ions.

SUMMARY OF THE INVENTION

Accordingly, it is an object of the present invention to sensitize the luminescence of trivalent erbium and ytterbium laser ions with trivalent molybdenum ions.

It is a second object of the invention to provide a laser structure in which trivalent molybdenum ions sensitize high energy levels of trivalent erbium and ytterbium ions.

It is another object of the invention to provide such a laser structure in which trivalent erbium laser ions are contained in a glass laser rod and trivalent molybdenum sensitizer ions are contained in a fluorescent converter disposed within a resonant laser cavity containing the laser rod.

Briefly, the invention in its broadest aspect comprises a laser structure having a laser rod which contains a first quantity of active laser ions being contained within a suitable matrix. The active laser ions are chosen from a group consisting of trivalent erbium ions and trivalent ytterbium ions. A second quantity of trivalent molybdenum ions serve to sensitize the active state of the active laser ions. Means are included for containing the molybdenum ions in close proximity to the erbium ions. Finally, means are provided for supplying pumping light energy to the molybdenum and active laser ions.

Further objects, advantages, and features of the invention will be apparent in the arrangement and construction of the constituent parts, in detail, as set forth in the following specification taken together with the accompanying drawing.

DESCRIPTION OF THE DRAWING

In the drawing, the single figure is a schematic representation of a laser structure constructed according to the invention.

DETAILED DESCRIPTION OF THE PREFERRED EMBODIMENTS

Referring now to the single figure of the drawing, there is shown a laser structure, which is generally designated by the reference numeral 10, having the present invention embodied therein. The laser structure 10 is comprised of a laser rod 12 and a means for supplying pumping light energy 18. The laser rod 12 is formed of a core 14 and a surrounding cladding 16. The core 14 is formed of a suitable glass which has trivalent erbium ions disposed therein. The erbium ions are the active laser ions within this laser structure. The cladding 16 is, in turn, formed of a glass having trivalent molybdenum ions disposed therein. The molybdenum ions serve to sensitize, i.e., to enhance the efficiency of pumping, the erbium doped laser rod core 14.

The laser structure 10 may be formed as a laser oscillator as is shown in the figure or as a laser amplifier. The laser oscillator has the laser rod emplaced in a resonant laser cavity which is formed by the reflectors 20 and 22. The first reflector 20 is totally reflecting and the second reflector 22 is partially transmissive to allow the output pulse, represented by an arrow 24 to be emitted from the resonant cavity. In a laser amplifier, the reflectors are removed and an input signal is applied to the rod.

A so-called erbium laser must contain trivalent erbium ions. These are produced normally by admixing $Er_2O_3$ with the base glass. However, $ErCl_3$, $Er(No_3)$, and $Er(PO_4)$ may be used in the glass melt for producing the trivalent erbium ions in the laser glass. The base glass may be a phosphate, lanthanum borate, barium crown, or the like, all of which are conventional in the art for producing erbium lasers.

The active erbium ions in an erbium doped glass laser rod exhibit a series of relatively sharp absorption bands throughout the visible and near infrared portions of the electromagnetic spectrum which give the glass a characteristic pink coloration. However, the molar extinction coefficient of the erbium ions is quite low and as such the erbium ions absorb very little energy in the visible portion of the spectrum.

Conversely, the pumping light energy sources which are in general usage emit a broad spectrum of wavelengths throughout the visible and near infrared portion of the spectrum.

Therefore, trivalent erbium ions are very inefficient absorbers of the pumping light energy. For a practical laser to be produced, this efficiency must be greatly improved in order to excite enough ions into the higher metastable energy level.

Trivalent molybdenum ions absorb light energy quite readily throughout the range from 320 to 550 nm (nanometers). In addition, trivalent molybdenum exhibits strong absorption bands centered at approximately 350 and 450 nm. Therefore, the trivalent molybdenum ions are able to absorb a much greater portion of the pumping light energy than can the erbium ions.

Trivalent molybdenum ions fluoresce in a broad band which is centered at approximately 1.025 $\mu$m. This band is approximately 80 nm wide at the one-half intensity points. This fluorescence band then coincides quite closely with a strong absorption band of trivalent erbium which is centered at 980 nm. In this manner, the energy which is efficiently absorbed by the trivalent molybdenum ions in the visible portion of the spectrum may be transferred to the erbium ions, thereby appreciably increasing the overall efficiency of the erbium laser material.

Similarly, the aforementioned publication sets forth the use of trivalent ytterbium ions as sensitizing agents for trivalent erbium ions. It is another feature of the invention to sensitize the trivalent ytterbium ions with trivalent molybdenum ions. Trivalent ytterbium ions exhibit a strong characteristic absorption band which is centered at approximately 975 nm. Therefore, the trivalent ytterbium ions may also be sensitized by the broad fluoresence of the trivalent molybdenum ions.

This sensitizing of the trivalent ytterbium ions has a twofold benefit. Firstly, the sensitized trivalent ytterbium ions are able to sensitize the trivalent erbium ions quite efficiently as was set forth in the above-referenced publication. Secondly, trivalent ytterbium ions have been utilized as active laser ions and emit at a wavelength of 1.015 $\mu$m. Therefore, the trivalent molybdenum ions provide a significant sensitizing agent for both erbium and ytterbium laser materials.

Trivalent molybdenum ions in glass impart an amber color to the glass. The trivalent molybdenum valence state is not easily obtained in glass, since strong reducing conditions must be maintained through the the production in order to obtain any appreciable amount of trivalent molybdenum in the glass.

In general, the optical quality of glasses which are doped with trivalent molybdenum ions is presently sufficiently poor to preclude the direct incorporation of the trivalent molybdenum ions directly into a laser glass. It is, however, within the intended purview of this invention to include laser mediums doped with trivalent molybdenum sensitizer ions. The presently preferred technique is to contain the trivalent molybdenum ions within a fluorescent converter which is disposed within the resonant cavity. The fluorescent converter may take many forms, such as a plate of material containing the trivalent molybdenum ions which is interposed between the source of pumping light energy and the rod containing the active laser ions, or a second piece of material axially adjacent the laser rod. However, the presently preferred form for the fluorescent converter is an integral cladding surrounding the laser rod. The trivalent molybdenum ions are contained within the cladding glass so that pumping light energy in the visible portion of the spectrum is absorbed by the trivalent molybdenum ions which then fluoresce in an absorption band of the trivalent erbium and/or ytterbium ions. Thus, it is possible to obtain a substantial amount of trivalent molybdenum ions in the cladding glass, and the laser glass is not affected by the poor optical qualities of the cladding glass. Further, the cladding may be made thin enough so that the optical quality of the cladding glass does not greatly effect the transmittance of the unabsorbed pumping light energy into the laser rod.

A suitable cladding glass containing trivalent molybdenum ions may be produced by admixing the materials listed in the following table:

| Material | Weight (grams) | Weight Percent |
| --- | --- | --- |
| $Al(PO_3)_3$ | 437.80 | 86.69 |
| ZnO | 49.75 | 9.85 |
| $Sb_2O_3$ | 9.95 | 1.97 |
| $MoO_3$ | 2.50 | 0.50 |
| Carbon | 5.00 | 0.99 |

The batch is melted at about 2,700°F. and stirred at that temperature. The melt is refined for bubbles at about 2500° F. and 2,400° F. and subsequently cast at 2400° F. The glass may then be annealed to remove as much strain as possible. The glass may then be used to clad the laser rod in any conventional manner.

The glass is normally prepared in a Globar furnace under a nitrogen atmosphere in order to maximize the reduction of the molybdenum to the desired trivalent valence state. Preferably, the zinc oxide, molybdenum trioxide, and antimony oxide are reagent grade.

A suitable quantity of $MoO_3$ in the cladding to effect an increase in efficiency of absorption of pumping light energy by the erbium ions is on the order of from 0.01 to 5.0 weight percent.

While there have been shown and described what are considered to be preferred embodiments of the present invention, it will be obvious to those skilled in the art that various changes and modifications may be made therein without departing from the invention.

We claim:
1. A laser structure comprising
   a laser rod aligned within a resonant cavity and having a first quantity of active laser ions being contained within a suitable matrix, the active laser ions being chosen from a group consisting of trivalent erbium ions and trivalent ytterbium ions,
   a second quantity of trivalent molybdenum ions, the molybdenum ions serving to sensitize the active state of the active laser ions,
   the trivalent molybdenum ions being contained in a fluorescent converter which is disposed within the resonant cavity in close proximity to the laser rod containing the active laser ions,
   the fluorescent converter being comprised of a suitable glass matrix containing from 0.01 to 5.0 weight percent of $MoO_3$, and
   means for supplying pumping light energy to the trivalent molybdenum and active laser ions.

2. A laser structure according to claim 1, in which the active laser ions are trivalent erbium ions, and a third quantity of trivalent ytterbium ions are suitable contained in close proximity to both the trivalent molybdenum and trivalent erbium ions.

3. A laser structure according to claim 1, in which the fluorescent converter is formed as a tube disposed about the laser rod.

4. A laser structure according to claim 3, in which the fluorescent converter tube is disposed in a surrounding contacting relation to the side wall portions of the laser rod throughout substantially the entire length thereof.

5. A laser structure according to claim 4, wherein the cladding glass contains approximately 0.5 weight percent of $MoO_3$.

6. A laser structure according to claim 5, wherein the cladding glass contains a major portion of $Al(PO_3)_3$ with minor portions of $ZnO$ and $Sb_2O_3$.

7. A laser structure according to claim 6, wherein the cladding glass consists of essentially the following constituents given in weight percent.

| | |
|---|---|
| $Al(PO_3)_3$ | 86.69 |
| $ZnO$ | 9.85 |
| $Sb_2O_3$ | 1.97 |
| $MoO_3$ | 0.50 |
| Carbon | 0.99 |

* * * * *